(12) United States Patent
Kim et al.

(10) Patent No.: US 8,968,938 B2
(45) Date of Patent: *Mar. 3, 2015

(54) NON-AQUEOUS ELECTROLYTE AND ELECTROCHEMICAL DEVICE WITH AN IMPROVED SAFETY

(75) Inventors: Young Soo Kim, Yangsan-si (KR); Soon Ho Ahn, Daejeon (KR); Joon Sung Bae, Daejeon (KR); Cha Hun Ku, Daejeon (KR); Soo Hyun Ha, Busan (KR); Duk Hyun Ryu, Daejeon (KR); Sei Lin Yoon, Seoul (KR)

(73) Assignee: LG Chem, Ltd. (KR)

( * ) Notice: Subject to any disclaimer, the term of this patent is extended or adjusted under 35 U.S.C. 154(b) by 908 days.

This patent is subject to a terminal disclaimer.

(21) Appl. No.: 12/087,813

(22) PCT Filed: Jan. 12, 2007

(86) PCT No.: PCT/KR2007/000214
§ 371 (c)(1),
(2), (4) Date: Jul. 14, 2008

(87) PCT Pub. No.: WO2007/081169
PCT Pub. Date: Jul. 19, 2007

(65) Prior Publication Data
US 2009/0047582 A1 Feb. 19, 2009

(30) Foreign Application Priority Data

Jan. 12, 2006 (KR) .................. 10-2006-0003675

(51) Int. Cl.
| | |
|---|---|
| *H01M 6/18* | (2006.01) |
| *H01M 10/0567* | (2010.01) |
| *H01M 10/0569* | (2010.01) |
| *H01M 4/13* | (2010.01) |
| *H01M 4/139* | (2010.01) |
| *H01M 10/052* | (2010.01) |
| *H01M 10/42* | (2006.01) |

(52) U.S. Cl.
CPC ...... *H01M 10/0567* (2013.01); *H01M 10/0569* (2013.01); *H01M 4/13* (2013.01); *H01M 4/139* (2013.01); *H01M 10/052* (2013.01); *H01M 10/4235* (2013.01); *H01M 2300/004* (2013.01); Y02E 60/122 (2013.01)
USPC .......... 429/307; 429/326; 429/327; 429/329; 429/330; 429/331; 429/332; 429/339; 429/199; 429/200; 252/62.2; 252/364

(58) Field of Classification Search
CPC ............... H01M 10/0567; H01M 10/0569; H01M 2300/0028; H01M 2300/004; H01M 2300/0042; H01M 10/052; Y02E 60/122
USPC ......... 429/307, 326, 327, 329, 330, 331, 332, 429/199, 200, 339; 252/62.2, 364
See application file for complete search history.

(56) References Cited

U.S. PATENT DOCUMENTS

| | | | |
|---|---|---|---|
| 6,506,524 B1 | 1/2003 | McMillan et al. | |
| 6,743,947 B1 | 6/2004 | Xu et al. | |
| 7,718,311 B2 * | 5/2010 | Yamaguchi et al. | 429/324 |
| 7,718,322 B2 * | 5/2010 | Lee et al. | 429/339 |
| 2004/0197667 A1 | 10/2004 | Noh et al. | |
| 2005/0031963 A1 | 2/2005 | Im et al. | |
| 2005/0084765 A1 * | 4/2005 | Lee et al. | 429/330 |
| 2005/0208371 A1 | 9/2005 | Kim et al. | |
| 2005/0221168 A1 | 10/2005 | Dahn et al. | |
| 2006/0035144 A1 * | 2/2006 | Shimizu et al. | 429/307 |
| 2006/0099515 A1 | 5/2006 | Yamaguchi et al. | |
| 2006/0194118 A1 * | 8/2006 | Yew et al. | 429/330 |
| 2006/0204834 A1 * | 9/2006 | Kim et al. | 429/65 |

FOREIGN PATENT DOCUMENTS

| | | |
|---|---|---|
| CN | 1543006 A | 11/2004 |
| CN | 1612405 | 5/2005 |
| EP | 1150374 A1 | 4/2001 |

(Continued)

OTHER PUBLICATIONS

Taiwan Office Action for application No. 096101227 dated Jul. 13, 2010 with English Translation.

(Continued)

*Primary Examiner* — Laura Weiner
(74) *Attorney, Agent, or Firm* — Lerner, David, Littenberg, Krumholz & Mentlik, LLP

(57) ABSTRACT

Disclosed are a non-aqueous electrolyte comprising a lithium salt and a solvent, the electrolyte containing, based on the weight of the electrolyte, 10-40 wt % of a compound of Formula 1 or its decomposition product, and 1-40 wt % of an aliphatic nitrile compound, as well as an electrochemical device comprising the non-aqueous electrolyte. Also disclosed is an electrochemical device comprising: a cathode having a complex formed between the surface of a cathode active material and an aliphatic nitrile compound; and an anode having formed thereon a coating layer containing a decomposition product of the compound of Formula 1. Moreover, disclosed is an electrochemical device comprising: a cathode having a complex formed between the surface of a cathode active material and an aliphatic nitrile compound; and a non-aqueous electrolyte containing the compound of Formula 1 or its decomposition product. In addition, disclosed is an electrochemical device comprising: an anode having formed thereon a coating layer containing a decomposition product of the compound of Formula 1; and a non-aqueous electrolyte containing the compound of Formula 1 or its decomposition product.

9 Claims, 8 Drawing Sheets
(8 of 8 Drawing Sheet(s) Filed in Color)

(56) References Cited

FOREIGN PATENT DOCUMENTS

| | | |
|---|---|---|
| EP | 1463143 A3 | 8/2003 |
| EP | 1508934 A1 | 8/2004 |
| EP | 1696501 A1 | 2/2006 |
| JP | 10-247519 | 9/1998 |
| JP | 2005072003 A | 3/2005 |
| JP | 2005108440 A | 4/2005 |
| JP | 2006134719 A | 5/2006 |
| JP | 2007149535 A | 6/2007 |
| KR | 10-2001-0098895 | 11/2001 |
| KR | 10-2003-0057321 | 7/2003 |
| KR | 10-2005-0075297 | 7/2005 |
| KR | 10-2005-0078443 | 8/2005 |
| KR | 10-2005-0089246 | 9/2005 |
| KR | 10-2007-0003852 | 7/2007 |
| TW | 200520276 | 6/2005 |
| WO | 9735332 A1 | 9/1997 |
| WO | 9815024 A1 | 4/1998 |
| WO | WO 03/075371 * | 9/2003 |
| WO | 2005024991 A1 | 3/2005 |
| WO | 2005069423 A1 | 7/2005 |
| WO | 2005117198 A1 | 12/2005 |
| WO | 2007/094625 A1 | 8/2007 |
| WO | 2007/094626 A1 | 8/2007 |

OTHER PUBLICATIONS

Chinese Office Action for application No. 200780003093.1 issued Jan. 17, 2011 with English Translation.

Office Action dated Feb. 12, 2010; issued by the Chinese Patent Office; Chinese Patent Application No. 200780003093.1 (claiming priority from Korean Patent Application No. 10-2006-0003675); corresponding to PCT/KR2007/000214 dated Apr. 20, 2007.

International Search Report for corresponding International Application No. PCT/KR2007/000214 dated Apr. 20, 2007.

Written Opinion of the Ineternational Searching Authority for corresponding International Application No. PCT/KR2007/000214 dated Apr. 20, 2007.

European Supplementary Search Report issued in the corresponding European Patent Application No. 07 700 944.7 on Apr. 26, 2010 (claiming priority from Korean Patent Application No. 10-2006-0003675). PCT/KR2007000214.

McMillan R et al: "Fluoroethylene carbonate electrolyte and its use in lithium ion batteries with graphite anodes": Journal of Power Sources, Elsevier SA, CH LNKD-DOI:10.1016/SO378-7753(98)00201-8, vol. 81-82, Sep. 1, 1999, pp. 20-26, XP004363118 ISSN: 0378-7753.

Smart M C et al: "Improved performance of lithium-ion cells with the use of fluorinated carbonate-based electrolytes" Journal of Power Sources, Elsevier SA, CH LNKD-DOI:10.1016/S0378-7753(03)00266-0, vol. 119-121, Jun. 1, 2003, pp. 359-367, XP004430195.

Kang Xu et al: "Evaluation of Fluorinated Alkyl Phosphates as Flame Retardants in Electrolytes for Li-Ion Batteries II. Performance in Cell"; Journal of the Electrochemical Society, Electrochemical Society, Manchester, New Hampshire, US LNKD-DOI:10.1149/1.1533041, vol. 150, No. 2, Jan. 1, 2003, pp. A170-A175, XP007906704.

* cited by examiner

NON-AQUEOUS ELECTROLYTE AND ELECTROCHEMICAL DEVICE WITH AN IMPROVED SAFETY

TECHNICAL FIELD

The present invention relates to a non-aqueous electrolyte having improved safety and to an electrochemical device comprising the same.

BACKGROUND ART

Recently, as electronic instruments have become wireless and portable, non-aqueous electrolyte-based secondary batteries with high capacity and high energy density have been practically used as drive sources for the electronic instruments. A lithium secondary battery, which is a typical example of the non-aqueous secondary batteries, comprises a cathode, an anode and an electrolyte and is chargeable and dischargeable because lithium ions coming out from a cathode active material during a charge process are intercalated into an anode active material and deintercalated during a discharge process, so that the lithium ions run between both the electrodes while serving to transfer energy. Such a high-capacity lithium secondary battery has an advantage in that it can be used for a long period of time due to high energy density. However, the lithium secondary battery has problems in that when the battery is exposed to high temperatures for a long period of time due to internal heat generation during the driving thereof, the stable structure of the battery, comprising a cathode (lithium transition metal oxide), an anode (crystalline or non-crystalline carbon) and a separator, will be changed due to gas generation caused by the oxidation of the electrolyte to deteriorate the performance of the battery or, in severe cases, to cause the ignition and explosion of the battery due to internal short circuits in severe cases.

To solve such problems, there have been many recent attempts to improve the high-temperature safety of the battery by (1) using a porous polyolefin-based separator having a high melting point, which does not easily melt in the internal/external thermal environments or (2) adding a non-flammable organic solvent to a non-aqueous electrolyte comprising a lithium salt and a flammable organic solvent.

However, the polyolefin-based separator has a disadvantage in that it should generally have high film thickness in order to achieve high-melting point and to prevent internal short circuits. This high film thickness relatively reduces the loading amount of the cathode and the anode, thus making it impossible to realize a high capacity of the battery, or deteriorating the performance of the battery in severe cases. Also, the polyolefin-based separator consists of a polymer such as PE or PP, which has a melting point of about 150° C., and thus, when the battery is exposed to high temperatures above 150° C. for a long period of time, the separator will melt, causing short circuits inside the battery, thus causing the ignition and explosion of the battery.

Meanwhile, a lithium secondary battery comprising a flammable non-aqueous electrolyte containing a lithium salt, cyclic carbonate and linear carbonate has the following problems at high temperatures: (1) a large amount of heat is generated due to the reaction between lithium transition metal oxide and the carbonate solvent to cause the short circuit and ignition of the battery, and (2) a thermally stable battery cannot be realized due to the flammability of the non-aqueous electrolyte itself.

Recently, efforts to solve the problems associated with the flammability of the electrolyte by adding a phosphorus (P)-based compound having flame retardancy have been made, but the compound causes a problem of accelerating irreversible reactions, including Li corrosion, in a battery, thus significantly reducing the performance and efficiency of the battery.

DISCLOSURE OF THE INVENTION

The present inventors have found that when a fluoroethylene carbonate (FEC) compound is used as an electrolyte solvent, and an aliphatic mono- or di-nitrile compound is used as an electrolyte additive, these compounds show a synergic effect in terms of the prevention of battery ignition caused by external physical shock (e.g., thermal shock) and/or the prevention of ignition/explosion caused by internal short circuit of a battery at high temperatures above 150° C., that is, in terms of the safety of the battery. The present invention is based on this finding.

The present invention provides a non-aqueous electrolyte comprising a lithium salt and a solvent, the electrolyte containing, based on the weight of the electrolyte, 10-40 wt % of a compound of Formula 1 or its decomposition product, and 1-40 wt % of an aliphatic nitrile compound, as well as an electrochemical device comprising the non-aqueous electrolyte:

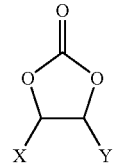

[Formula 1]

wherein X and Y are each independently hydrogen, chlorine or fluorine, except that both X and Y are not hydrogen.

In another aspect, the present invention provides an electrochemical device comprising: a cathode having a complex formed between the surface of a cathode active material and an aliphatic nitrile compound; and an anode having formed thereon a coating layer containing a decomposition product of the compound of Formula 1.

In still another aspect, the present invention provides an electrochemical device comprising: a cathode having a complex formed between the surface of a cathode active material and an aliphatic nitrile compound; and a non-aqueous electrolyte containing the compound of Formula 1 or its decomposition product.

In yet another aspect, the present invention provides an electrochemical device comprising: an anode having formed thereon a coating layer containing a decomposition product of the compound of Formula 1; and a non-aqueous electrolyte containing an aliphatic nitrile compound.

In the present invention, the aliphatic nitrile compound may be an aliphatic mono-nitrile compound, an aliphatic di-nitrile compound, or a mixture thereof, wherein the aliphatic mono-nitrile compound may be represented by Formula 2 below, and the aliphatic di-nitrile compound may be represented by Formula 3 below:

$$N\equiv C-R \quad \text{[Formula 2]}$$

wherein R is $(CH_2)_n-CH_3$ (n is an integer of 1-11); and $$N\equiv C-R-C\equiv N \quad \text{[Formula 3]}$$

wherein R is $(CH_2)_n$ (n is an integer of 2-12).

In the present invention, the aliphatic nitrile compound is preferably succinonitrile, butyronitrile, valeronitrile, or a mixture thereof.

Moreover, in the present invention, the decomposition product of the compound of Formula 1 has an opened-ring structure.

BRIEF DESCRIPTION OF THE DRAWINGS

The patent or application file contains at least one drawing executed in color. Copies of this patent or patent application publication with color drawings will be provided by the office upon request and payment of the necessary fee.

FIG. 1 is for Example 1, FIG. 2 for Example 2, FIG. 3 for Example 3, FIG. 4 for Comparative Example 1, FIG. 5 for Comparative Example 3, FIG. 6 for Comparative Example 2, and FIG. 7 for Comparative Example 4.

MODE FOR CARRYING OUT THE INVENTION

Figure 1:
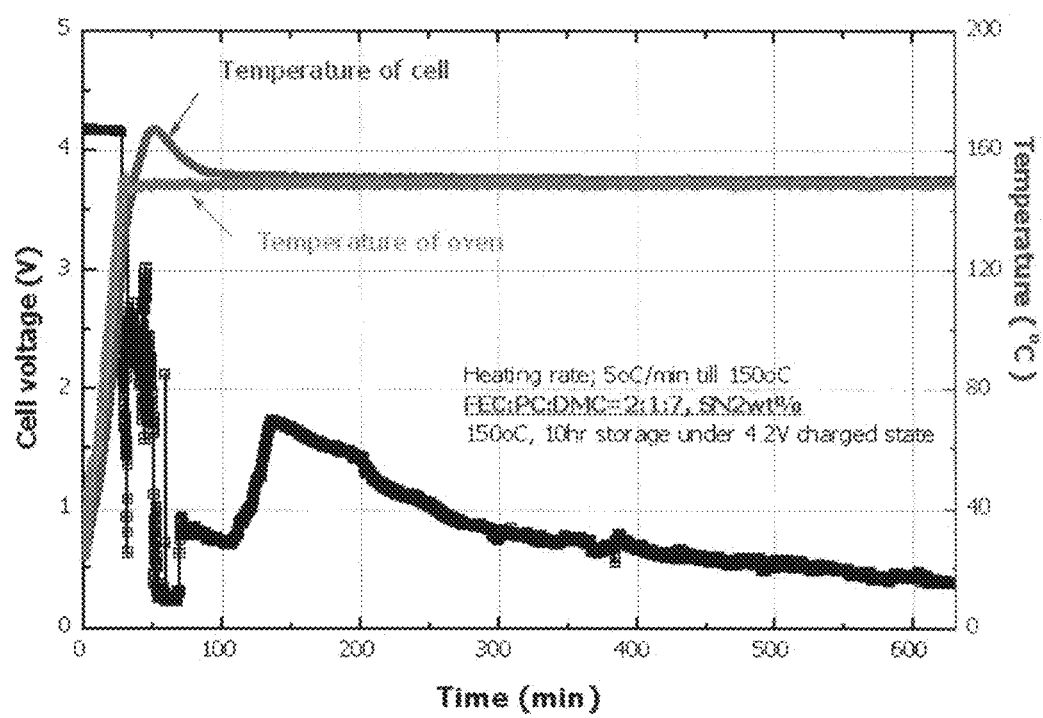
FIGS. 1 to 7 are graphic diagrams showing whether the ignition and explosion of batteries occur after the batteries are stored in an oven at 150° C. in a state in which the batteries are charged to 4.2V. Herein.

Hereinafter, the present invention will be described in detail.

The present inventors have found through experiments that the compound of Formula 1 and a nitrile compound having a cyano (—CN) functional group show a synergic effect in terms of securing battery safety associated with thermal shock and in terms of high-temperature cycle life (see Experiment 1 and FIGS. 1 to 7).

When the compound of Formula 1 and the aliphatic nitrile compound are used in combination, they can show a synergic effect in terms of the safety of a battery, and the mechanism thereof is as follows.

The ignition and explosion reactions of a lithium ion battery can occur due to a rapid exothermic reaction between a charged cathode and an electrolyte, and if the capacity of the battery increases, only controlling the exothermic reaction between the cathode and the electrolyte cannot secure the safety of the battery.

Generally, when the charge voltage of the cathode is high or the capacity of the battery is increased (an increase in the number of stacks (pouch type batteries, etc.) or the number of electrode windings of jelly-rolls (cylindrical or prismatic batteries, etc.)), the energy level of the battery will be increased, and thus the battery will tend to generate heat due to physical shock (e.g., heat, temperature, pressure, etc.), or in severe cases, explode, thus reducing the safety of the battery.

The compound of Formula 1 can prevent or delay the battery from being ignited by the exothermic reaction, compared to ethylene carbonate. This is because the compound of Formula 1 consists of a halogen-based compound (e.g., one introduced with at least one of fluorine (F) and chlorine (Cl)) having a high flame-retardant effect, and in particular, the compound can form an SEI layer (protective layer) on the anode surface upon charge to delay micro- or macro-thermal short circuits occurring inside the battery.

However, when the compound of Formula 1 or its decomposition product is used alone, the safety of the battery, particularly the high-temperature safety of the battery, cannot be sufficiently secured (see FIGS. 4 and 5), and thus the present invention is characterized in that the aliphatic nitrile compound is used in combination with the compound of Formula 1 or its decomposition product.

When the aliphatic nitrile compound is used in combination with the compound of Formula 1 or its decomposition product, the aliphatic nitrile compound can form a complex on the surface of a cathode consisting of lithium-transition metal oxide so as to inhibit the reaction between the electrolyte and the cathode, thus controlling heat generation and controlling an increase in the temperature of the battery. Also, the complex formation can prevent the combustion of the electrolyte, which is accelerated by oxygen liberated due to the structural collapse of the cathode, prevent thermal runaway phenomena, and prevent the internal short circuit of the battery from occurring due to heat generation (see FIG. 8).

In short, 1) the compound of Formula 1 or its decomposition product and 2) the resulting protective layer which is made of a complex formed between an aliphatic di-nitrile compound such as succinonitrile or an aliphatic mono-nitrile compound such as butyronitrile and the surface of a cathode active material, can show a synergic effect, thus improving the safety of the battery.

Furthermore, when the compound of Formula 1 or its decomposition product and the aliphatic nitrile compound are used in combination, they can show a synergic effect in terms of the performance of a battery, and the mechanism thereof is as follows.

The compound of Formula 1 or its decomposition product forms a dense and close passivation layer on the anode upon the initial charge cycle (which is generally referred as formation of a battery). The passivation layer prevents co-intercalation of the carbonate solvent into the layered structure of active materials and decomposition of the carbonate solvent, and thus reduces irreversible reactions in the battery. Additionally, the passivation layer allows only $Li^+$ to be intercalated/deintercalated through the layer, thereby improving the life characteristics of the battery.

However, the passivation layer (SEI layer) formed by the compound is easily decomposed at high temperature (above 60° C.) to generate a large amount of gas ($CO_2$ and CO), and particularly in the case of a cylindrical battery, the generated gas breaks a current interruptive device (CID), an electrochemical device at a cylindrical cap region, to interrupt electric current, thus reducing the function of the battery. In severe cases, the generated gas opens the cap region, so that the electrolyte leaks to corrode the appearance of the battery or to cause a significant reduction in the performance of the battery.

According to the present invention, gas generation resulting from the compound of Formula 1 or its decomposition product can be inhibited through the use of the aliphatic nitrile compound by the chemical interaction between the compound of Formula 1 or its decomposition and a cyano (—CN) functional group, thus improving the high-temperature cycle life characteristics of the battery.

When considering this effect together with an improvement in the performance of a high-capacity battery, butyronitrile or valeronitrile is most suitable as aliphatic mono-nitrile, and succinonitrile is most suitable as aliphatic di-nitrile.

Among aliphatic di-nitrile compounds, those having long chain length have no great effect on the performance and safety of the battery or adversely affect the performance of the battery, and thus those having short chain length are preferable. However, malononitrile (CN—$CH_2$—CN) having an excessively short chain length causes side reactions such as gas generation in the battery, and thus it is preferable to use those having 2-12 aliphatic hydrocarbons (CN—$(CH_2)_n$—CN, n=2-12), including succinonitrile. Among them, it is more preferable to select nitrile having small carbon number. Most preferred is succinonitrile.

Aliphatic mono-nitrile compounds show the same tendency as mentioned above for the aliphatic di-nitrile compounds, but when considering side reactions in the battery, it is preferable to select those having 2-12 aliphatic carbons (CN—$(CH_2)_n$—$CH_3$, n=1-11). Among them, it is more preferable to select nitrile having small carbon number. Butyronitrile and valeronitrile are most preferable.

Meanwhile, among compounds containing a cyano functional group, aromatic nitriles and fluorinated aromatic nitrile compounds are not preferable because they are electrochemically easily decomposed in the battery to interfere with the migration of Li ions, thus deteriorating the performance of the battery.

The content of the compound of Formula 1 or its decomposition product for use as a solvent in the inventive electrolyte is preferably 10-40 wt %.

The compound of Formula 1 is a compound introduced with at least one of fluorine (F) and chlorine (Cl) having high electronegativity, and has high oxidation voltage, i.e., high oxidation resistance, because it is difficult to oxidize due to the strong electron withdrawing effect of fluorine or chlorine. Accordingly, the compound of Formula 1 is not decomposed even at a high charge voltage of more than 4.2V, for example, a high charge voltage of more than 4.35V, and thus can sufficiently function as an electrolyte solvent. Therefore, if the compound of Formula 1 is used as an electrolyte solvent in a battery, the battery will show excellent cycle life characteristics, even when it is charged to 4.35 V and discharged.

Meanwhile, the compound of Formula 1 or its decomposition product is first consumed for the formation of a passivation layer. Herein, the consumed amount of the compound of Formula 1 or its decomposition product is proportional to the electric capacity of the anode. Also, the compound of Formula 1 remaining after use in the formation of the passivation layer on the anode serves as an electrolyte solvent to exhibit battery safety such as flame retardancy. Thus, another characteristic of the present invention is to use the compound of Formula 1 or its decomposition product in an amount that can remain in an electrolyte even after the formation of the anode passivation layer, for example, in an amount of 10 wt % or more based on the weight of the electrolyte.

As described above, it is preferable to use a large amount of the compound of Formula 1 in terms of battery safety such as flame retardancy, but the compound of Formula 1 can reduce the cycle life and capacity of a battery because it has high viscosity to reduce the ion conductivity of an electrolyte and to interfere with the migration of Li ions. For this reason, it is preferable to use the compound of Formula 1 in an amount of 40 wt % or less based on the weight of the electrolyte.

In the content of the aliphatic di-nitrile compound is preferably 1-10 wt %, more preferably 1-5 wt %, and most preferably 1-3 wt %, in view of the performance of the electrolyte.

Also, the aliphatic mono-nitrile compounds, particularly butyronitrile and valeronitrile, have the effects of increasing the ion conductivity of the electrolyte and reducing the viscosity of the electrolyte, and for this reason, the content of the aliphatic mono-nitrile compound in the electrolyte is preferably 1-40 wt %, more preferably 1-20 wt %, and most preferably 1-10 wt %.

The inventive non-aqueous electrolyte for lithium secondary batteries generally contain, in addition to the compound of Formula 1, flammable non-aqueous organic solvents, including cyclic carbonates, linear carbonates and combinations thereof. Typical examples of the cyclic carbonates include ethylene carbonate (EC), propylene carbonate (PC), gamma-butyrolactone (GBL) and the like, and typical examples of the linear carbonates include diethyl carbonate (DEC), dimethyl carbonate (DMC), ethylmethyl carbonate (EMC) and the like.

The non-aqueous electrolyte contains a lithium salt, non-limiting examples of which include $LiClO_4$, $LiCF_3SO_3$, $LiPF_6$, $LiBF_4$, $LiAsF_6$, $LiSbF_6$, $LiN(CF_3SO_2)_2$, $LiN(C_2F_5SO_2)_2$, $LiAlO_4$, $LiAlCl_4$, $LiSO_3CF_3$, and $LiN(C_xF_{2x+1}SO_2)(C_yF_{2y+1}SO_2)$ (x and y=natural numbers).

Meanwhile, the aliphatic nitrile compounds can form a bond with a transition metal, such as cobalt, contained in the cathode active material through their cyano functional groups having high dipole moment. Particularly, the cyano functional groups can form stronger bonds with the surface of the cathode at high temperature, thereby forming a complex structure.

In order to simplify a manufacturing process of a battery, it is preferable that the aliphatic nitrile compound is introduced into an electrolyte, and then a complex is formed between the surface of a cathode active material and the aliphatic nitrile compound. However, it is also possible to separately prepare a cathode having a complex formed on the surface thereof, before the assemblage of a battery.

Preferably, the complex between the surface of a cathode active material and the aliphatic nitrile compound is formed by dipping a cathode, comprising a cathode active material coated on a collector, into an electrolyte containing the aliphatic nitrile compound added thereto, followed by heat treatment at high temperature. The high-temperature heat treatment may be performed in such a temperature range as not to affect electrode active materials and a binder, generally at a temperature of 180° C. or lower. Otherwise, although the high-temperature heat treatment depends on the kind of the aliphatic nitrile compound, it may be performed at such a temperature range as to prevent excessive evaporation of the aliphatic nitrile compound, generally at a temperature of 100° C. or lower. In general, the high-temperature treatment is suitably performed at a temperature between 60° C. and 90° C. Long-term treatment at a temperature between 30° C. and 40° C. may provide the same effect.

In addition, in the present invention, a compound capable of forming a passivation layer on the surface of an anode may additionally be used to prevent side reactions where a passivation layer formed on the anode from the compound of Formula 1, such as fluoroethylene carbonate, emits a large amount of gas at high temperature. Non-limiting examples of the compound include alkylene compounds, such as vinylene carbonate (VC), sulfur-containing compounds, such as propane sulfone, ethylene sulfite and 1,3-propane sultone, and lactam-based compounds, such as N-acetyl lactam.

Furthermore, the electrolyte according to the present invention may comprise vinylene carbonate, propane sulfone and ethylene sulfite at the same time, but only a sulfur-containing compound may also be selectively added to the electrolyte to improve the high-temperature cycle life characteristics of the battery.

A typical example of electrochemical devices, which can be manufactured according to the present invention, is a lithium secondary battery, which may comprise: (1) a cathode capable of intercalating and deintercalating lithium ions; (2) an anode capable of intercalating and deintercalating lithium ions; (3) a porous separator; and (4) a) a lithium salt, and b) an electrolyte solvent.

In general, as a cathode active material for use in a lithium secondary battery, lithium-containing transition metal oxides may be used. The cathode active material can be at least one material selected from the group consisting of $LiCoO_2$, $LiNiO_2$, $LiMn_2O_4$, $LiMnO_2$, and $LiNi_{1-x}Co_xM_yO_2$ (wherein $0≤X≤1, 0≤Y≤1, 0≤X+Y≤1$, M is a metal such as Mg, Al, Sr or La). Meanwhile, as an anode active material for use a lithium secondary battery, carbon, lithium metal or lithium alloy may be used. In addition, other metal oxides capable of lithium intercalation/deintercalation and having an electric potential of less than 2V based on lithium (for example, $TiO_2$ and $SnO_2$) may be used as the anode active material.

The lithium secondary battery according to the present invention may have a cylindrical, prismatic or pouch-like shape.

Hereinafter, the present invention will be described in further detail with reference to examples. It is to be understood, however, that these examples are illustrative only and the present invention is not limited thereto.

EXAMPLES

Example 1

An electrolyte used in this Example was a 0.8M $LiPF_6$ solution having a composition of FEC:PC:DMC=2:1:7. To the electrolyte, 2 wt % of succinonitrile was added. Artificial graphite and $LiCoO_2$ were used as an anode active material and a cathode active material, respectively. Then, a cylindrical battery was manufactured according to a conventional method.

Example 2

A cylindrical battery was manufactured in the same manner as in Example 1, except that the composition ratio of the carbonate solvent containing fluoroethylene carbonate (FEC) was 30:5:65.

Example 3

A cylindrical battery was manufactured in the same manner as in Example 1, except that 5 wt % of butyronitrile was used instead of succinonitrile.

Comparative Example 1

A 0.8M $LiPF_6$ solution having a composition of FEC:PC:DMC=2:1:7 was used as an electrolyte. Artificial graphite and $LiCoO_2$ were used as an anode active material and a cathode active material, respectively. Then, a cylindrical battery was manufactured according to a conventional method.

Comparative Example 2

A 0.8M $LiPF_6$ solution having a composition of EC:PC:DMC=2:1:7 was used as an electrolyte. To the electrolyte, 2 wt % of succinonitrile was added. Artificial graphite and $LiCoO_2$ were used as an anode active material and a cathode active material, respectively. Then, a cylindrical battery was manufactured according to a conventional method.

Comparative Example 3

A cylindrical battery was manufactured in the same manner as in Comparative Example 1, except that the composition ratio of the carbonate solvent containing fluoroethylene carbonate (FEC) was 30:5:65.

Comparative Example 4

A cylindrical battery was manufactured in the same manner as in Comparative Example 2, except that 5 wt % of butyronitrile was used instead of succinonitrile.

The batteries obtained from the above Examples and Comparative Examples were all subjected to heat treatment at 60° C. for 12 hours or more.

Experiment 1

Each of the batteries manufactured in Examples 1-3 and Comparative Examples 1-4 was charged to 4.25V and stored in an oven at 150° C., and then whether the ignition and explosion of the batteries occurred was observed. The observation results are shown in FIGS. 1 to 7.

Figure 2:
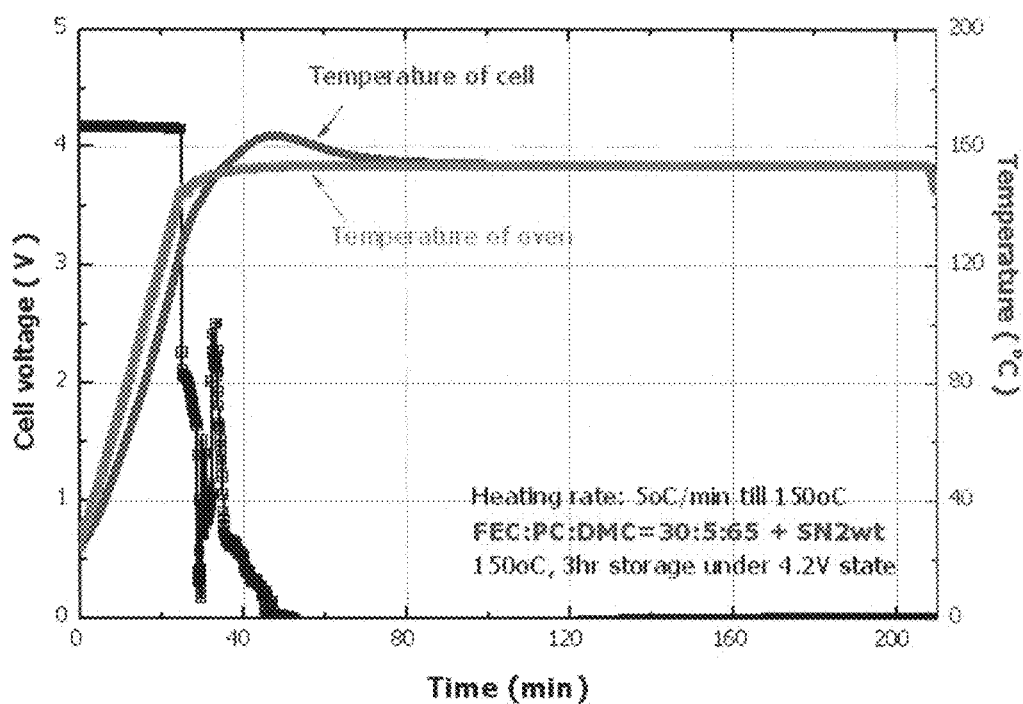
Figure 3:
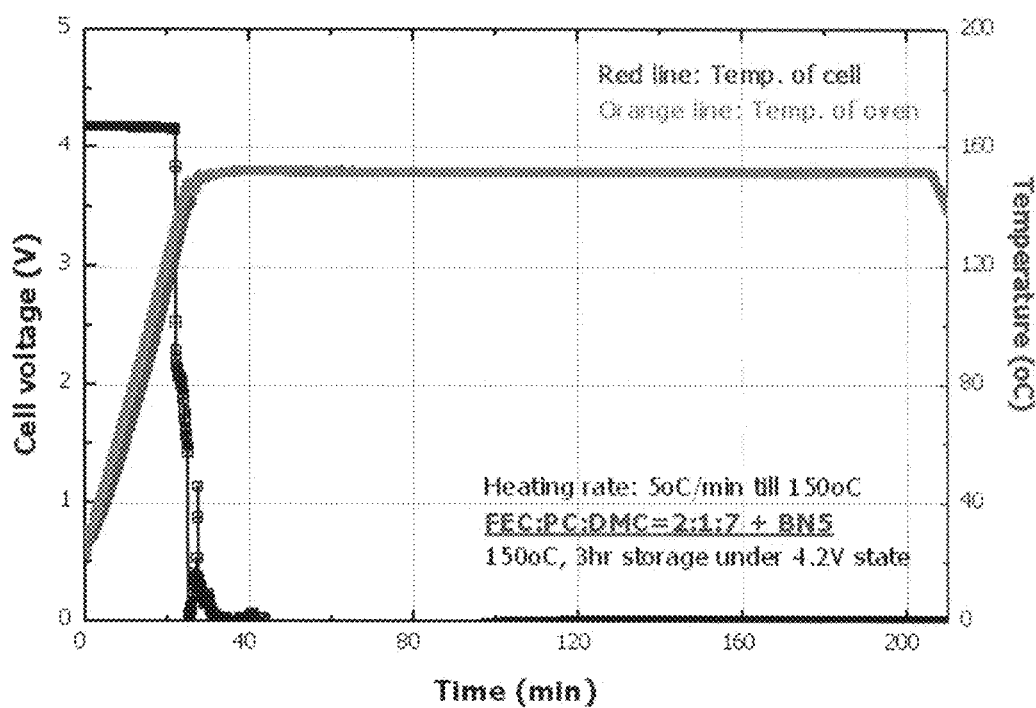
Figure 4:
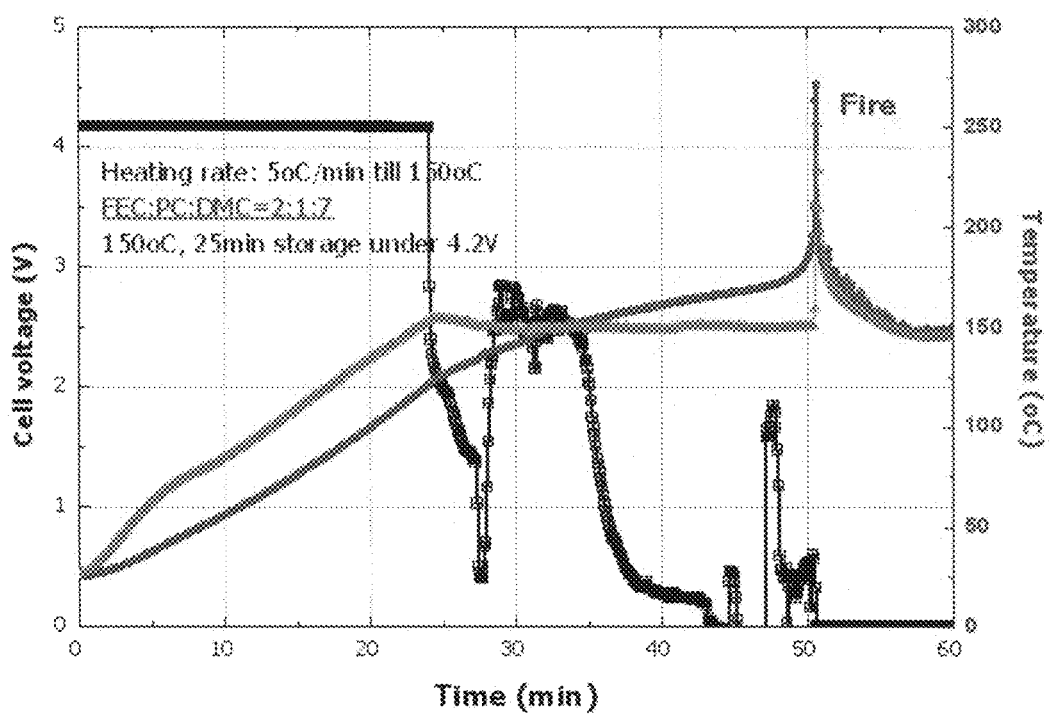
Figure 5:
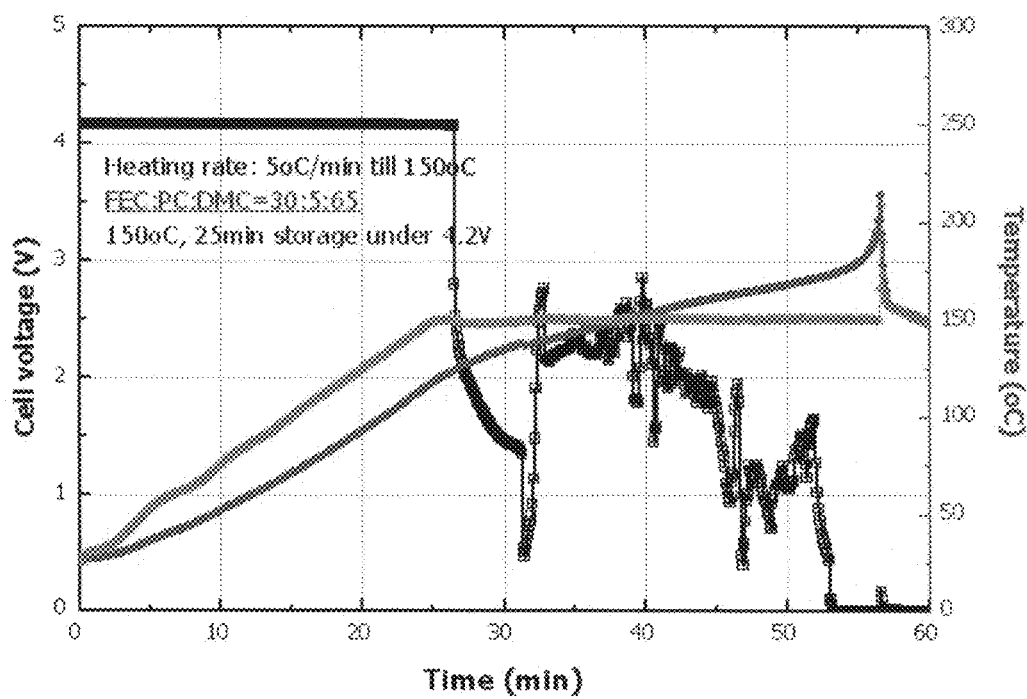
Figure 6:
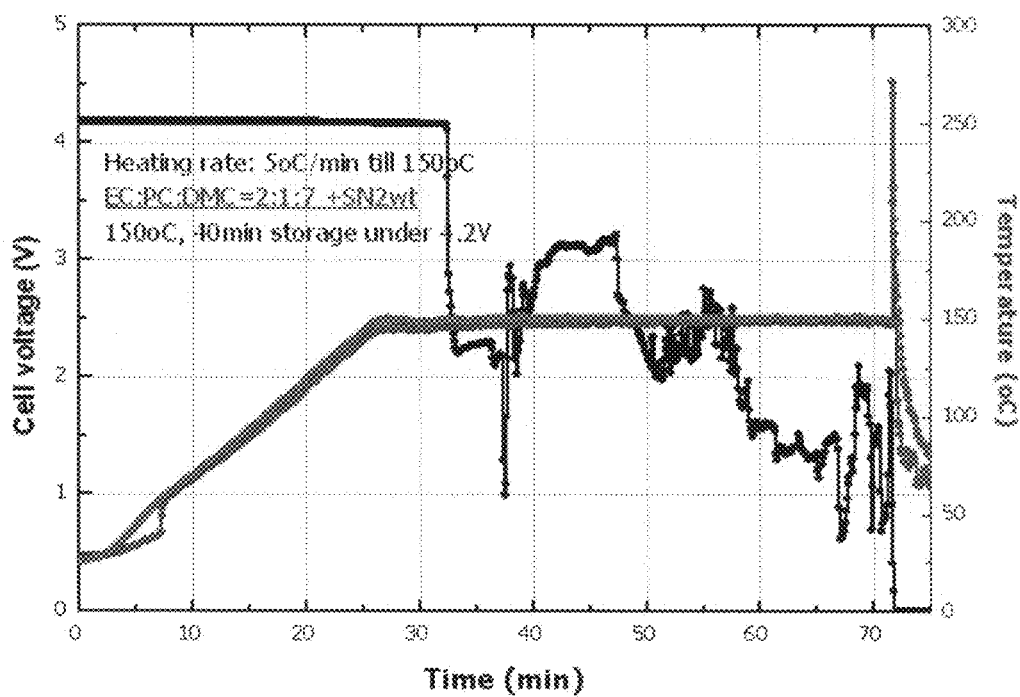

As can be seen in FIGS. 1, 2 and 3, only the case of the battery employing fluoroethylene carbonate as the electrolyte solvent and containing 2 wt % of the succinonitrile compound added to the electrolyte solvent, or the battery employing fluoroethylene carbonate as the electrolyte solvent and containing 5 wt % of the butyronitrile compound added to the electrolyte solvent, realized a thermally stable battery at high temperature for 3-10 hours or longer without ignition.

Figure 7:
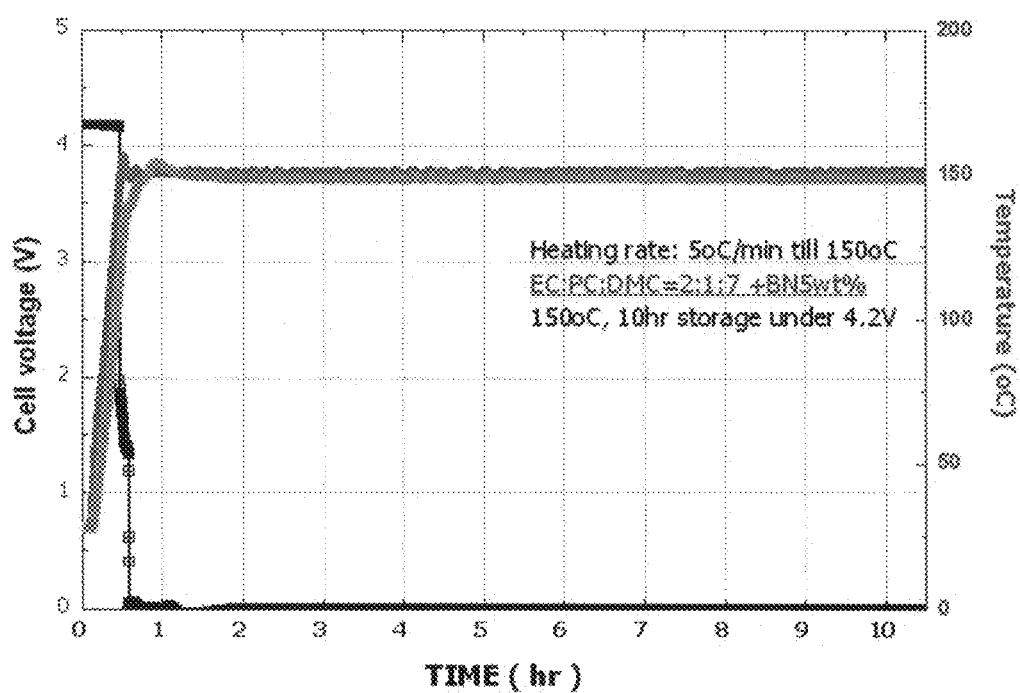

On the other hand, in the case of adding fluoroethylene carbonate alone (FIGS. 4 and 5), the case of adding only succinonitrile (FIG. 6), or the case of adding only butyronitrile (FIG. 7), it could be seen that the battery was ignited and exploded at high frequency at a high temperature above 150° C. without maintaining high-temperature safety. In the case of FIG. 7, a short circuit occurred within 1 hour to reduce voltage from 4.2V to 0V and to cause the explosion of the battery.

However, the battery comprising the electrolyte containing only succinonitrile added thereto had an advantage in that the time for the battery to explode was long because the battery was superior to the battery comprising the electrolyte containing fluoroethylene carbonate alone with respect to controlling heat generation resulting from the reaction between the cathode and the electrolyte and the structural collapse of the cathode.

Experiment 2

Each of the batteries manufactured in Examples 1 and 2 and Comparative Example 1 was charged to 4.2V. A general thermogravimetric analyzer, DSC (Differential Scanning calorimeter), was used, wherein two high-pressure pans capable of resisting the vapor pressure of the electrolyte were used as pans for measurement. To one pan, about 5-10 mg of the cathode sample separated from each of the batteries charged to 4.2V was introduced, while the other pan was left empty. The calorific difference between the two pans was analyzed while the pans were heated at a rate of 5° C./min to 400° C. to measure temperature peaks corresponding to heat generation.

Figure 8:
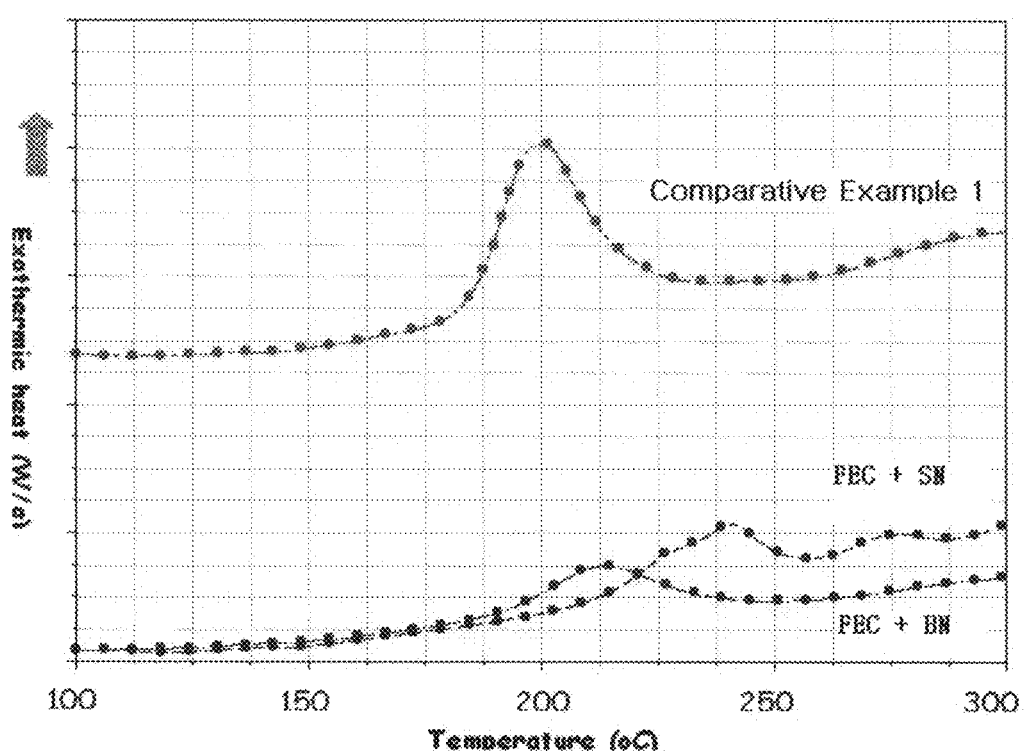
FIG. 8 is a graphic diagram showing the results of heat generation analysis conducted using differential scanning calorimetry (DSC) in order to examine the thermal stability of each of the batteries manufactured in Examples 1 and 3 and Comparative Example 1.

As shown in FIG. 8, the battery (Comparative Example 1) manufactured without the aliphatic mono- or di-nitrile compound shows heat generation peaks at about 200° C. Generally, the peak at about 200° C. indicates heat generation caused by the reaction between the electrolyte and the cathode, while the peak at about 240° C. indicates heat generation caused by combined factors including the reaction between the electrolyte and the cathode, and the structural collapse of the cathode. However, it could be seen that Comparative Example 1 showed a strong peak at about 200° C. together with heat generation caused by combined factors at about 240° C. On the other hand, the battery comprising the non-aqueous electrolyte containing succinonitrile or butyronitrile added thereto showed a remarkable reduction in heat generation without showing the above two temperature peaks. This indicates that heat generation caused by the reaction between the electrolyte and the cathode was controlled due to the formation of a protective layer through a strong bond between succinonitrile/butyronitrile and the cathode surface.

INDUSTRIAL APPLICABILITY

As can be seen from the foregoing, according to the present invention, when the compound of Formula 1 and the aliphatic nitrile compound are used in combination, they can show a synergic effect in terms of securing safety associated with thermal shock and in terms of high-temperature cycle life, even in the case of a high-capacity battery, and also can provide excellent battery performance.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A non-aqueous electrolyte comprising: a lithium salt and a solvent, the electrolyte containing, based on the weight of the electrolyte, 15-30 wt % of fluoroethylene carbonate, and 1-10 wt % of an aliphatic nitrile compound, wherein the aliphatic nitrile compound is succinonitrile, butyronitrile, valeronitrile or a mixture thereof.

2. The non-aqueous electrolyte of claim 1, wherein the solvent includes either or both of at least one cyclic carbonate selected from the group consisting of ethylene carbonate (EC), propylene carbonate (PC) and gamma-butyrolactone (GBL), and at least one linear carbonate selected from the group consisting of diethyl carbonate (DEC), dimethyl carbonate (DMC), ethyl methyl carbonate (EMC) and methyl propyl carbonate (MPC).

3. The non-aqueous electrolyte of claim 1, further comprising a compound selected from the group consisting of alkylene compounds, sulfur-containing compounds and lactam-based compounds, which can form a passivation layer on an anode surface.

4. An electrochemical device comprising a cathode, an anode, and the non-aqueous electrolyte according to claims 1.

5. The non-aqueous electrolyte of claim 1, wherein the fluoroethylene carbonate is present in an amount of 20-30 wt % based on the weight of the electrolyte.

6. A non-aqueous electrolyte comprising:
a lithium salt and a solvent, the electrolyte containing, based on the weight of the electrolyte, more than 10-30 wt % of fluoroethylene carbonate, and 1-10 wt % of an aliphatic nitrile compound, wherein the aliphatic nitrile compound is succinonitrile, butyronitrile, valeronitrile or a mixture thereof.

7. The non-aqueous electrolyte of claim 6, wherein the solvent includes either or both of at least one cyclic carbonate selected from the group consisting of ethylene carbonate (EC), propylene carbonate (PC) and gamma-butyrolactone (GBL), and at least one linear carbonate selected from the group consisting of diethyl carbonate (DEC), dimethyl carbonate (DMC), ethyl methyl carbonate (EMC) and methyl propyl carbonate (MPC).

8. The non-aqueous electrolyte of claim 6, further comprising a compound selected from the group consisting of alkylene compounds, sulfur-containing compounds and lactam-based compounds, which can form a passivation layer on an anode surface.

9. An electrochemical device comprising a cathode, an anode, and the non-aqueous electrolyte according to claim 6.

* * * * *